(12) United States Patent
Billman

(10) Patent No.: US 6,416,031 B1
(45) Date of Patent: Jul. 9, 2002

(54) BRACKET HAVING A METAL SHIELDING

(75) Inventor: Timothy B. Billman, Dover, PA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/580,378

(22) Filed: May 26, 2000

(51) Int. Cl.[7] .......................... A47G 29/00; F16M 11/00
(52) U.S. Cl. ..................... 248/694; 361/816; 439/607
(58) Field of Search ........................ 248/505, 506, 248/231.9, 694; 385/92; 361/800, 801, 816, 825; 439/607, 608, 609

(56) References Cited

U.S. PATENT DOCUMENTS

| | | | | |
|---|---|---|---|---|
| 5,637,015 A | * | 6/1997 | Tan et al. ................... | 439/607 |
| 5,777,854 A | * | 7/1998 | Welch et al. ................ | 361/800 |
| 5,967,845 A | * | 10/1999 | Ho et al. ..................... | 439/607 |
| 6,011,850 A | * | 1/2000 | Bertrand ...................... | 380/59 |
| 6,077,119 A | * | 6/2000 | Yu et al. ...................... | 439/607 |
| 6,095,862 A | * | 8/2000 | Doyle et al. ................. | 439/607 |
| 6,206,730 B1 | * | 3/2001 | Avery et al. ................. | 439/609 |

* cited by examiner

Primary Examiner—Leslie A. Braun
Assistant Examiner—Gwendolyn Baxter
(74) Attorney, Agent, or Firm—Wei Te Chung

(57) ABSTRACT

A bracket for receiving an external electrical device comprises a dielectric frame having a substantially U-shaped structure including a bottom and two side walls extending upright from two sides of the bottom. Each side wall has a top surface and an opposite bottom surface, a first gate formed in an front surface of the dielectric frame for entrance of the external electrical device. A metal shielding comprises an upper plate connected to a second gate which is connected to a lower plate substantially parallel to the upper long plate. The second gate is registered with and abuts against the first gate of the dielectric frame when the metal shielding is configured to the dielectric frame.

8 Claims, 7 Drawing Sheets

BRACKET HAVING A METAL SHIELDING

BACKGROUND OF THE INVENTION

1. Field of the Invention

The present invention relates to a bracket for receiving an external device such as a transceiver module or the like and, more particularly, to a bracket having a metal shielding which may be firmly configured to the bracket and prevent damages to the received device such as electrostatic discharge (ESD) or malfunction of the received device due to electromagnetic influence (EMI).

2. The Prior Art

Brackets have been used in many electrical devices such as personal computers or high frequency appliances for receiving an external electrical device inserted thereinto. The bracket is normally installed with a grounding tab for electrically contacting with a metallized outer shell of the electrical device for causing grounding connection therebetween especially for a high frequency electrical device such as a gigabit interface converter module, one of the most advanced optical transceiver module.

Earlier efforts to provide metal grounding tabs installed in a bracket may be referred to U.S. Pat. No. 5,879,173, wherein grounding tabs are insert molded in a receptacle which is a dielectric box having an entrance opening for receiving the transceiver module. The grounding tabs extend from a rear inner wall of the receptacle and expose to a chamber defined in the receptacle for abuttingly engaging with metal outer surface of the transceiver module when the latter is totally inserted into the receptacle. This kind of grounding tabs due to their locations deep in the receptacle will let the inserted transceiver module suffer electrostatic discharge (ESD) damage when the transceiver module is initially inserted into the receptacle because of existing static charges around the opening of the dielectric receptacle. Moreover, the receptacle due to the dielectric material of which it is made, will not prevent electromagnetic influence (EMI) to the inserted transceiver module. It is requisite to provide a bracket to overcome the problems as encountered in the conventional receptacle.

SUMMARY OF THE INVENTION

The primary purpose of the present invention is to provide a bracket having a metal shielding for preventing ESD or EMI occurred during insertion and normal operation of a high frequency electrical device which is receivable by the bracket.

According to one aspect of the present invention there is provided a bracket for receiving an external electrical device. The bracket comprises a dielectric frame having a substantially U-shaped structure including a bottom and two side walls extending upright from two sides of the bottom. Each side wall has a top surface and an opposite bottom surface, a first gate formed in an front surface of the dielectric frame for entrance of the external electrical device. A metal shielding comprises an upper plate connected to a second gate which is connected to a lower plate substantially parallel to the upper long plate. The second gate is registered with and abuts against the first gate of the dielectric frame when the metal shielding is configured to the dielectric frame.

DETAILED DESCRIPTION OF THE PREFERRED EMBODIMENT

Figure 1:
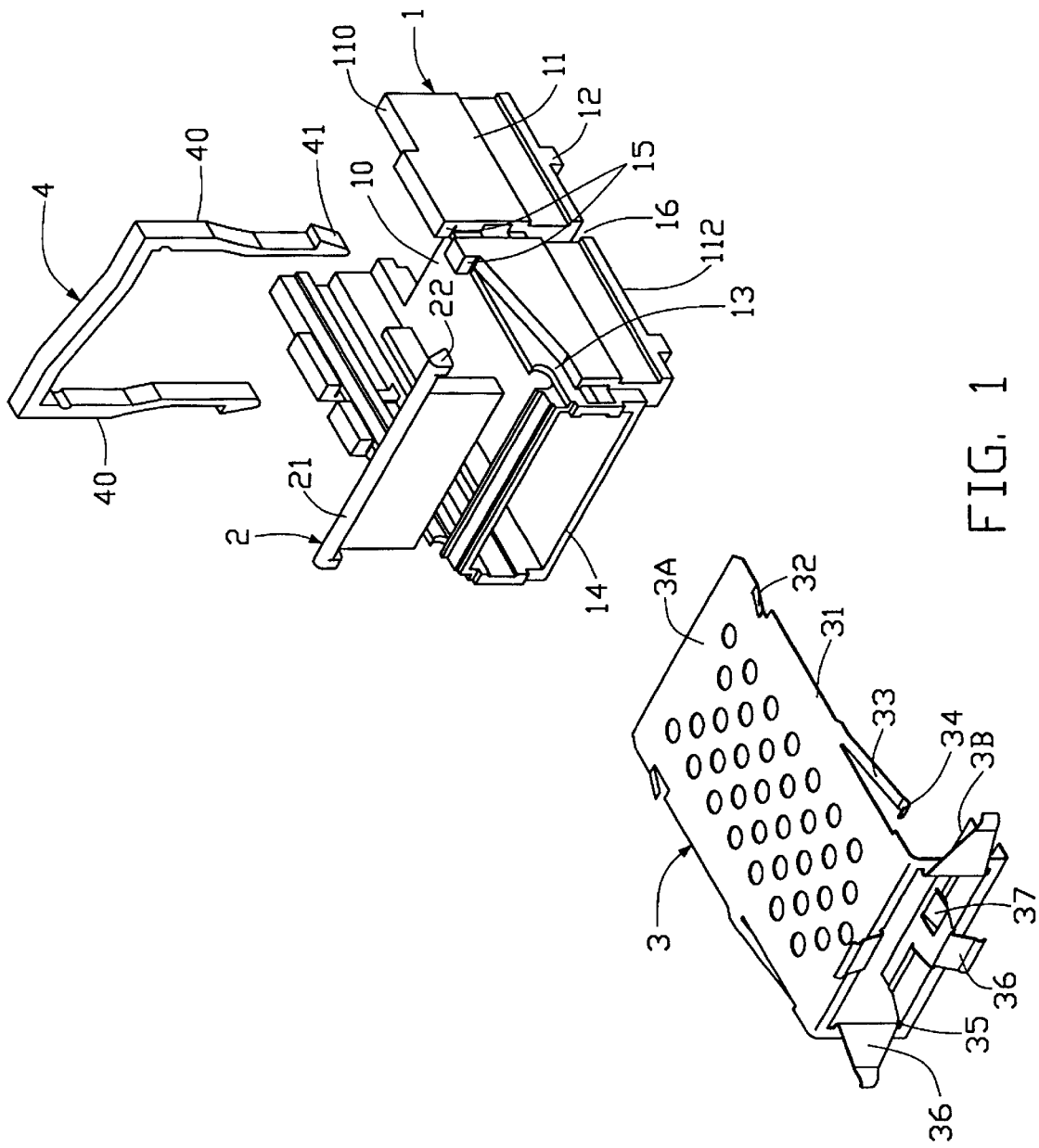
FIG. 1 is an exploded view of a bracket in accordance with the present invention having a dielectric frame, a metal door, a metal shielding, and a clip.

Referring to FIG. 1, a bracket in accordance with the present invention comprises a dielectric or die-casting frame 1 made by die casting, a metal door 2 ready to be received in the dielectric frame 1, a metal shielding 3 ready to be engaged with the dielectric frame 1, and a U-shaped clip 4 for further fixing the metal shielding 3 and the dielectric frame 1 together and finally mounting the two to a through hole of a printed circuit board (not shown).

The dielectric frame 1 has a substantially U-shaped structure having a bottom 10 and two side walls 11 extending upright from two sides of the bottom 10. Each side wall 11 has a top surface 110 and an opposite bottom surface 112. Two posts 12 extend downward from the bottom surface 112 of each side wall 11 for positioning the dielectric frame 1 on the printed circuit board (not shown). A beam 17 is connected between same front ends of the side walls 11 thus forming a first gate 14 for entrance of an external electrical device (see FIG. 5, numeral 8). A pair of positioning recesses 13, actually cutouts in this embodiment, are defined in opposite positions defined in the side walls 11. Two spaced-away flanges 15 extend from a top surface 110 of each side wall 11 and each flange 15 is spaced from the top surface 110 for a predetermined distance allowing a piece of metal sheet to be received therebetween. A positioning groove 16 is defined in a top-down manner substantially in a middle portion of each side wall 11. The positioning grooves 16 opposite to each other constitute a positioning member for retaining the U-shaped clip 4 which will be detailed later.

The metal door 2 is basically a plate having a shaft 21 formed at the top thereof and extending beyond opposite sides of the plate for a small distance. The shaft 21 terminates at each distal end thereof as a cam 22.

Figure 2:
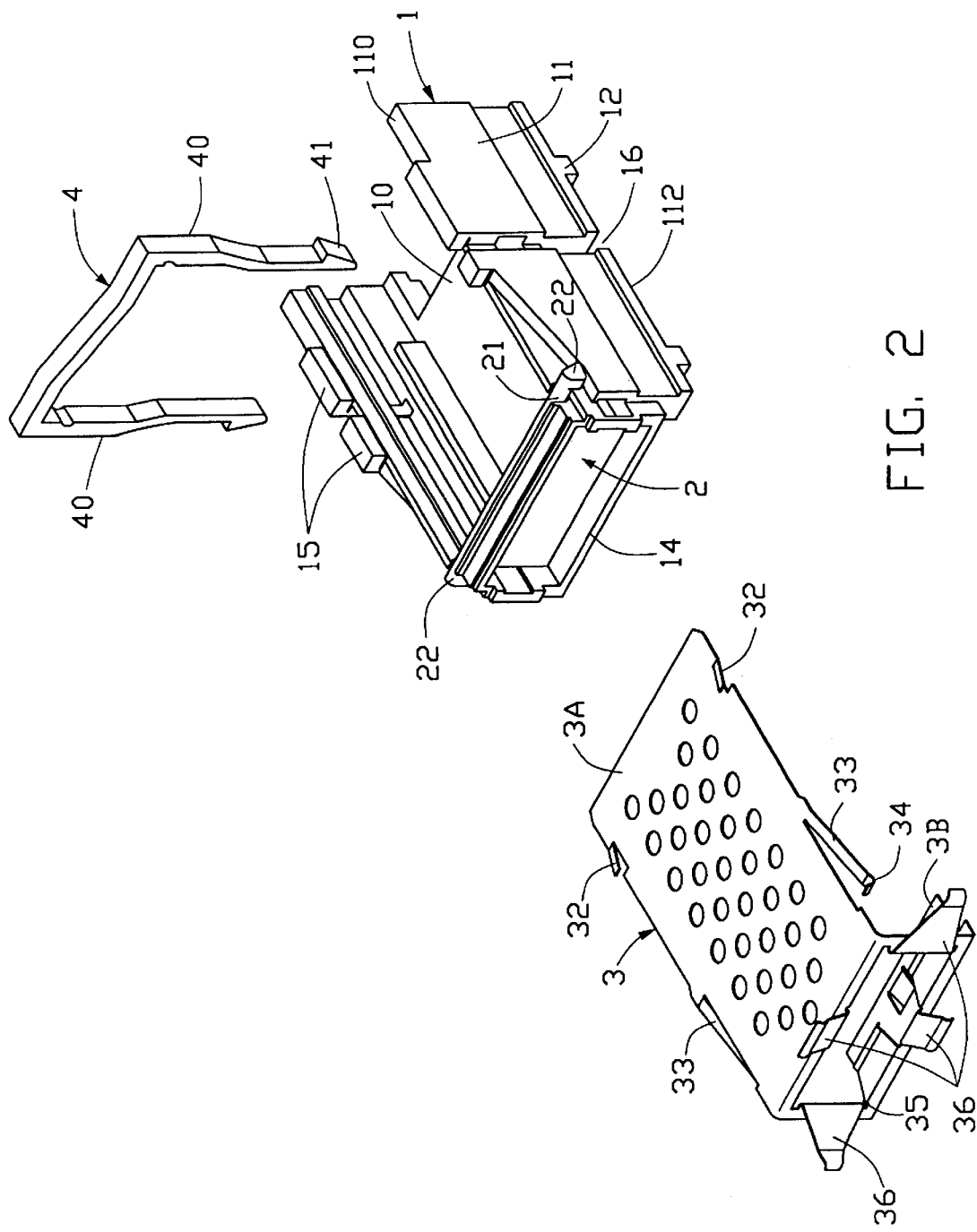
FIG. 2 is a view similar to FIG. 1, except that the metal door has beer configured to the dielectric frame.

Also referring to FIGS. 1 and 2, the metal door 2 is configured to the dielectric frame 1 by locating the shaft 21 thereof in the positioning recesses 13, with the cams 22 thereof respectively extending beyond the side walls 11 while the plate portion of the metal door 2 is positioned between the side walls 11 and blocks the entrance of the gate 14 which is defined by the beam (not labeled) and a front portion of the dielectric frame 1. With this configuration, the metal door 2 car be rotated with respect to the dielectric frame 1.

Further referring to FIG. 1, the metal shielding 3 comprises an upper long plate 3A connected to a second gate 35 which is further connected to a lower short plate 3B which is substantially parallel to the upper long plate 3A. The upper long plate 3A has a pair of first latches 32 shaped like upward tangs formed at opposite sides 31 thereof near a far end of the upper long plate 3A with respect to the second gate 35. A pair of spring arms 33 shaped like downward tangs is also formed at the opposite sides 31 near the second gate 35 and each spring arm 33 has a curved end 34. Four grounding tabs 36 extend from the second gate 35 for making electrical contact with a metal enclosure, such as a server enclosure (not shown) which accommodates the bracket therein when the bracket is used with the metal enclosure. A lower latch 37 is formed in the lower short plate 3B for engaging with a tapered protrusion (not shown) formed at the bottom surface of the dielectric frame 1.

Figure 3:
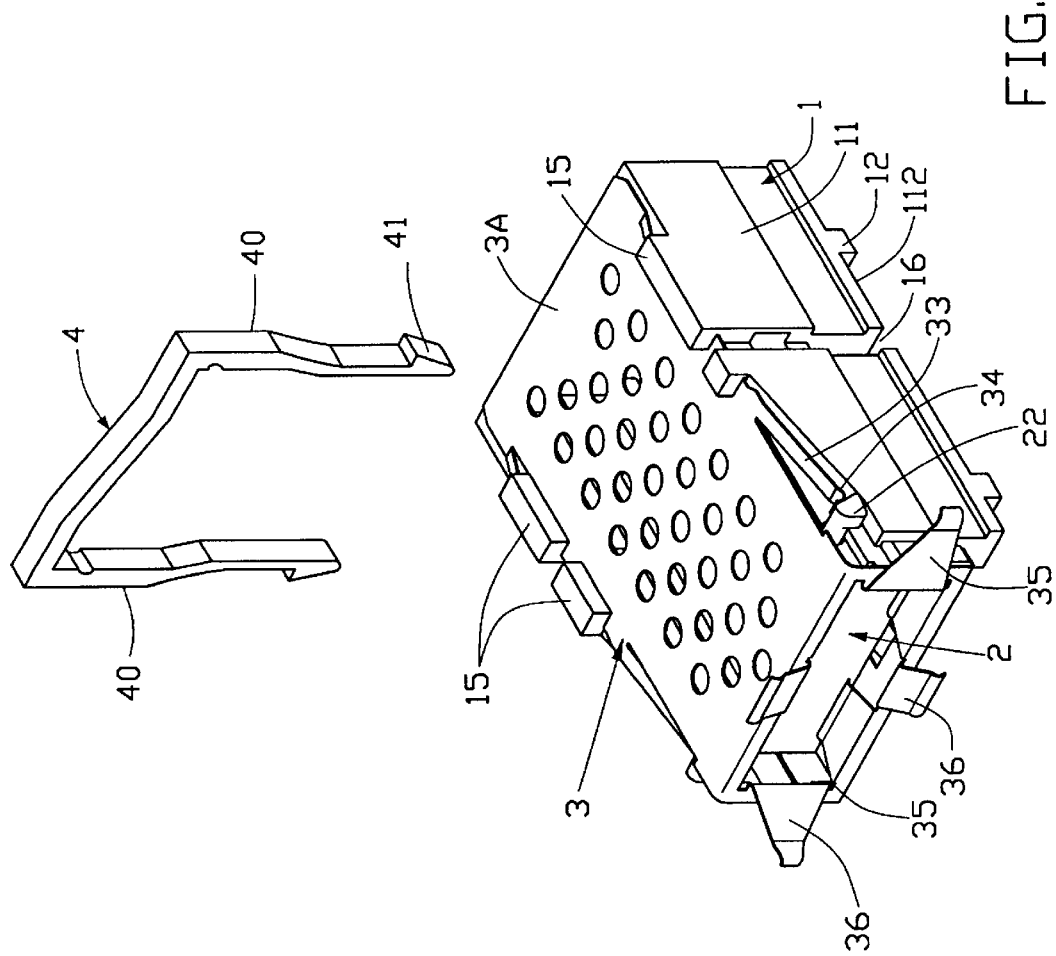
FIG. 3 is a view similar to FIG. 2, except that the metal shielding has been configured to the dielectric frame.

Also referring to FIGS. 1–3, the metal shielding 3 is configured to the dielectric frame 1 by sliding the upper long plate 3A and the lower short plate 3B respectively along the top surface 110 and the bottom surface 112 of the side wall 11 of the dielectric frame 1 until the second gate 35 abuts against the first gate 14 of the dielectric frame 1. Meanwhile each first latch 32 abuts against a corresponding one of the flanges 15, and the second latch 37 abuts against the tapered protrusion (not shown) formed at the bottom surface of the dielectric frame 1, thereby firmly fixing the metal shielding to the dielectric frame 1.

Figure 4:
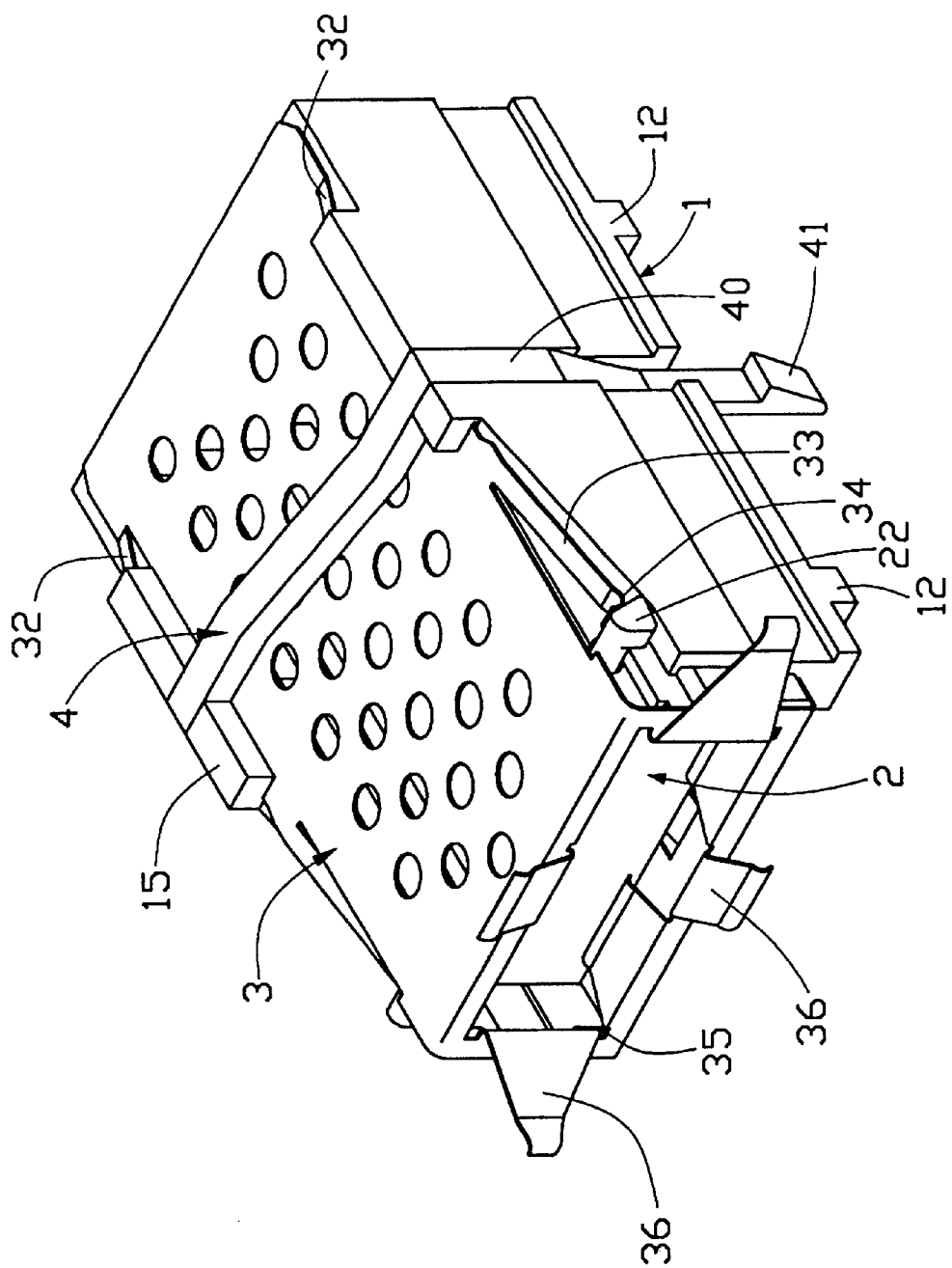
FIG. 4 is a view similar to FIG. 3, except that the clip has been configured to the dielectric frame.

Also referring to FIGS. 1 and 4, the U-shaped clip 4 comprises two prongs 40 which terminate as tapered ends 41. After the configuration of FIG. 3, the U-shaped clip 4 is then attached to the dielectric frame 1 by inserting the prongs 40 thereof to the positioning grooves 16, with the tapered ends 41 thereof extending beyond the bottom of the dielectric frame 1 functioning as a board lock for further mounting the whole bracket to the printed circuit board (not shown). Therefore, the bracket is well assembled and fixed to the printed circuit board (not shown) in FIG. 4. From above, it can be appreciated that the assembling of the bracket is quite simple and the assembled structure thereof is stable for long term use.

Figure 5:
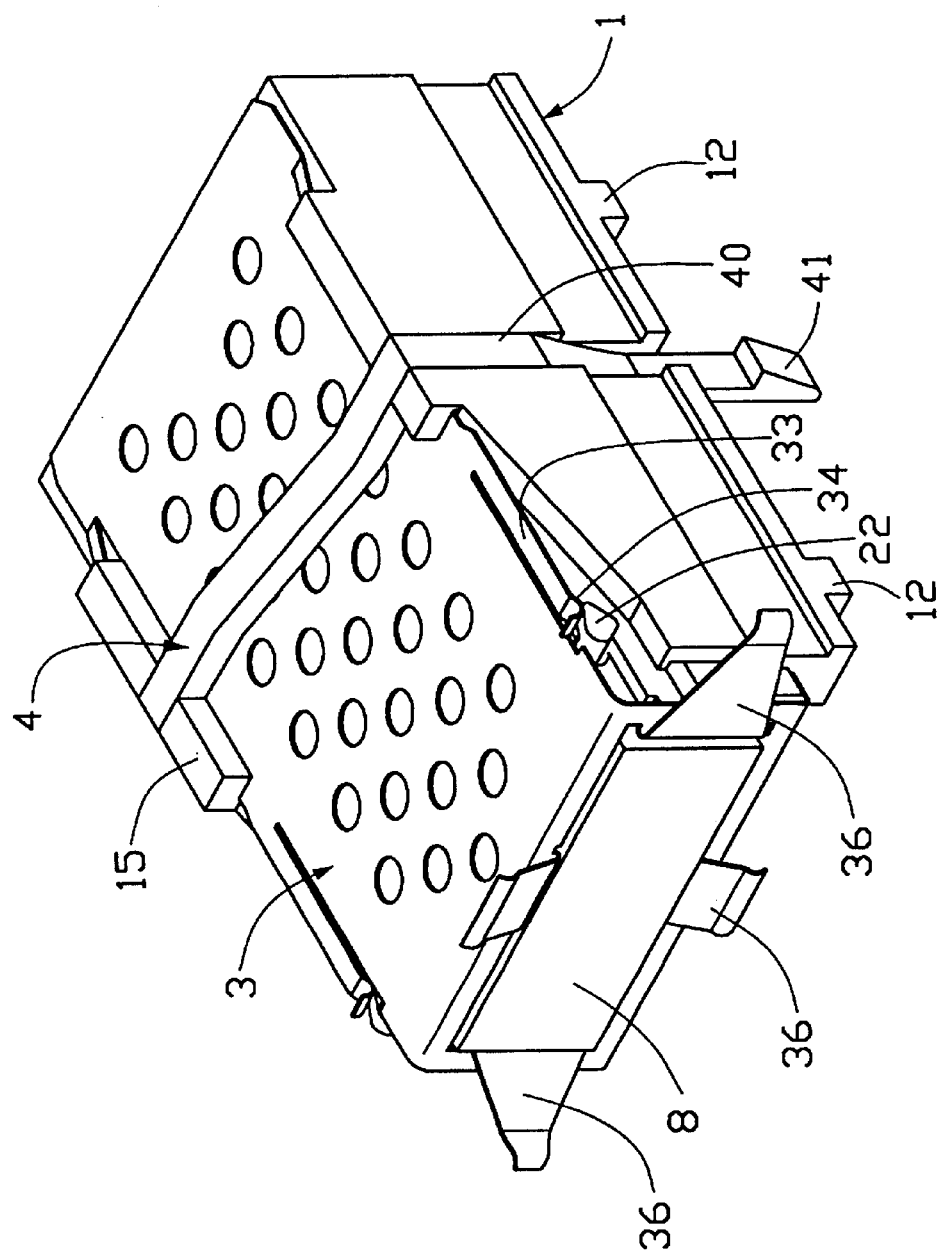
FIG. 5 is a view similar to FIG. 4, except that the metal door has been opened after insertion of an external electrical device.

Referring to FIG. 5, an external electrical device 8 having metal shell such as a gigabit interface converter module or other electrical card is inserted into the bracket, wherein the external electric device 8 is merely shown with partial schematic view for simplification. If for a practical gigabit interface converter module, a fiber cable (not shown) should be connected to the gigabit interface converter module and the fiber cable remains out of the bracket when the gigabit interface converter module is totally inserted in the bracket. When the electrical device 8 is originally inserted into the bracket from the second gate 35 (FIG. 4) thereof, the metal door 2 will be pushed inward and forced to rotate for substantially ninety degrees, meanwhile, each cam 22 will rotate for the same angle and lift the spring arm 33 to store a tension for recovering the metal door 2 back to its original position after the electrical device 8 is withdrawn from the bracket. The metal shielding 3 can prevent electrostatic discharge (ESD) damage when the electrical device is originally inserted into the bracket and also prevent electromagnetic interference (EMI) when the electrical device is retained in the bracket. The four grounding tabs 36 of the bracket wipe against the metal shell of the electrical device 3 and are in electrical contact with the metal shell of the electrical device 8 after the electrical device 8 is inserted into and positioned in the bracket.

Figure 6:
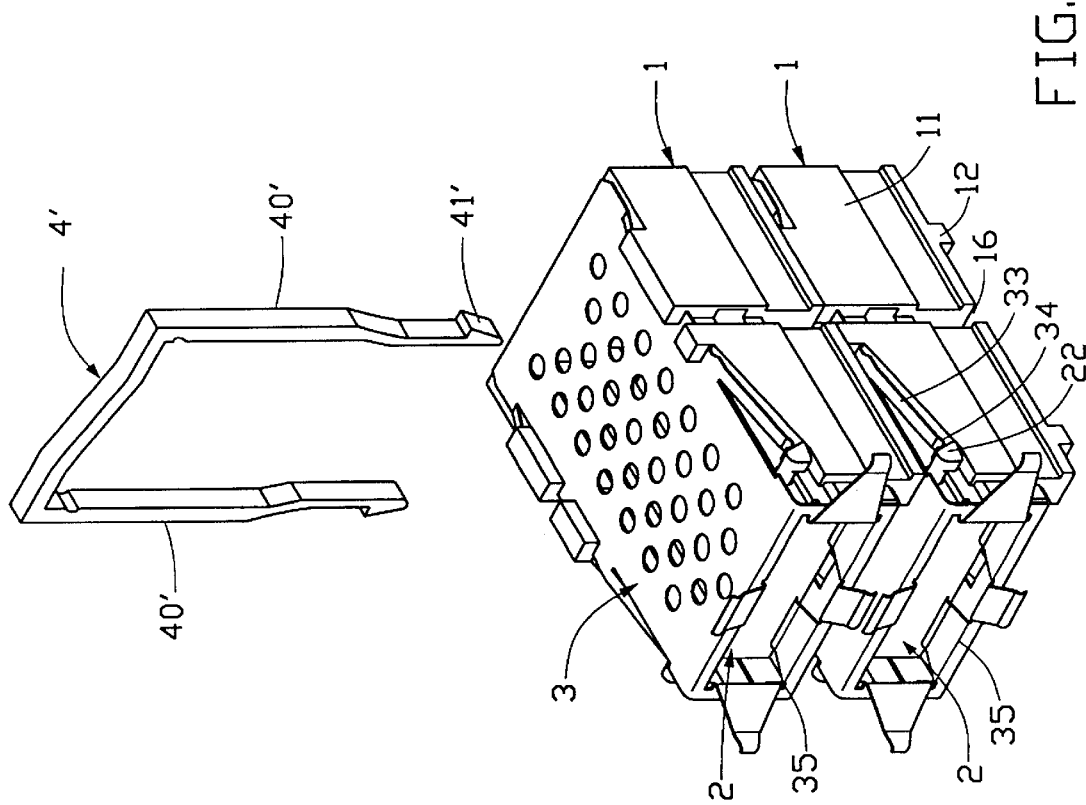
FIG. 6 is a second embodiment showing that two brackets are ready to be stacked together by a clip.

Referring to FIG. 6, a second embodiment of the present invention is shown with stacked structure, wherein the same parts regarding to those shown in the previous (first) embodiment are used with same reference numerals for simplification. In the second embodiment, the two brackets are almost identical to that of the first embodiment except that the posts 12 which extend downward from the upper bracket have been removed for configuration purpose. Moreover, the two stacked brackets commonly use a single U-shaped clip 4' which has a pair of prongs 40' longer than those shown in the first embodiment and each prong 40' terminates as a tapered end 41 for functioning like a board lock similar to that shown in the first embodiment.

Figure 7:
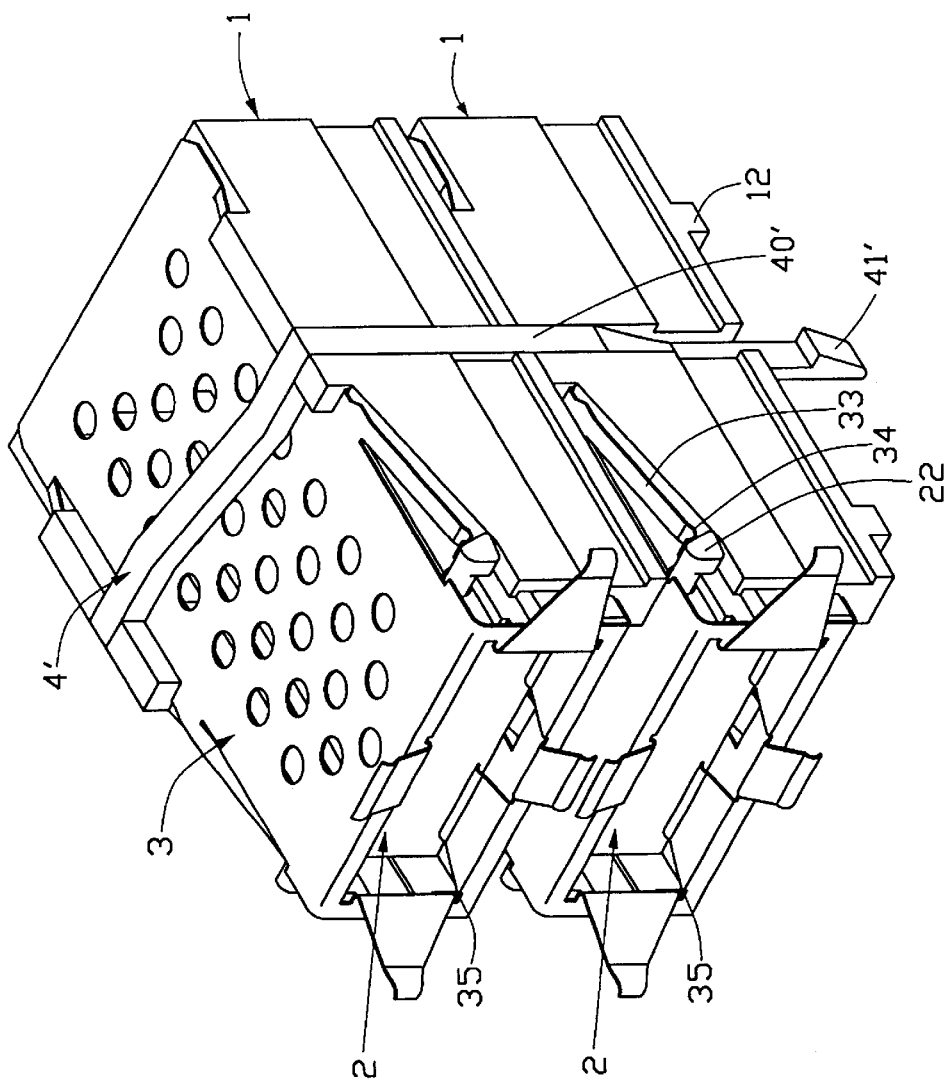
FIG. 7 is a fully assembled view of FIG. 6.

During assembling of the brackets, the corresponding positioning grooves 16 of the brackets have to be registered with each other, so that the prong 40' of the U-shaped clip 4' can be slid into and positioned in the registered positioning grooves 16 for fixing the brackets together. The stacked brackets may be referred to FIG. 7, wherein the tapered ends 41' can be further locked into a printed circuit board for board lock function and each bracket can receive a corresponding electrical device 8 shown in the first embodiment. The stacked brackets can be used in a backplane or a computer server for efficiently receiving the external electrical devices 8 therein, thus saving space which in turn causes compact size of the backplane or the computer server.

While the present invention has been described with reference to a specific embodiment, the description is illustrative of the invention and is not to be construed as limiting the invention. Therefore, various modifications to the present invention can be made to the preferred embodiment by those skilled in the art without departing from the true spirit and scope of the invention as defined by the appended claims.

What is claimed is:

1. A bracket for receiving an external electrical device, the bracket comprising:
   a dielectric frame having a substantially U-shaped structure including a bottom and two side walls extending upright from two sides of the bottom, each side wall having a top surface and an opposite bottom surface, a first gate formed in a front surface of the dielectric frame for entrance of the external electrical device; and
   a metal shielding comprising an upper long plate connected to a second gate which is connected to a lower plate substantially parallel to the upper long plate;
   wherein the second gate is registered with and abuts against the first gate of the dielectric frame when the metal shielding is configured to the dielectric frame;
   a metal door rotatably positioned on the dielectric frame and being under the metal shielding; wherein
   a flange extends from the top surface of each side wall and each flange has a horizontal portion spaced from the top surface for a predetermined distance allowing a piece of metal sheet to be received between the top surface and the flange; wherein
   the upper long plate of the metal shielding has a pair of first latches for abutting against the flange after the metal shielding is configured to the dielectric frame; wherein
   the first latch of the metal shielding is an upward tang.

2. The bracket as claimed in claim 1, wherein one of the first pair of latches is formed near a far end of the upper long plate with respect to the second gate.

3. The bracket as claimed in claim 2, wherein a grounding tab extends from the second gate.

4. The bracket as claimed in claim 3, wherein a lower latch is formed in the lower plate.

5. A bracket for receiving an external electrical device, the bracket comprising:
   a dielectric frame having a first gate formed in a front face thereof for entrance of the external electrical device; and
   a metal shielding comprising a second gate in a front face thereof and a grounding tab extending from the second gate;

wherein the second gate is registered with and abuts against the first gate of the dielectric frame when the metal shielding is configured to the dielectric frame and the electrical device wipes through the grounding tab and remains in contact with the grounding tab after being inserted into the bracket; wherein the dielectric frame has a substantially U-shaped stricture including a bottom and two side walls extending upright from two sides of the bottom, each side wall having a top surface and an opposite bottom surface, and the first gate is located in the front face of the dielectric frame connecting with the bottom and the side walls;

comprising a metal door rotatably positioned on the dielectric frame and being under the metal shielding; wherein a flange extends from the top surface of each side wall and each flange has a horizontal portion spaced from the top surface for a predetermined distance allowing a piece of metal sheet to be received between the top surface and the flange; wherein the metal shielding comprises an upper long plate connected to the second gate which is connected to a lower plate substantially parallel to the upper long plate; wherein the upper long plate of the metal shielding has a pair of first latches for abutting against the flange after the metal shielding is configured to the dielectric frame; wherein the upper long plate of the metal shielding is an upward tang.

6. The bracket as claimed in claim 5, wherein one of the first pair of latches is formed near a far end of the upper long plate with respect to the second gate.

7. A bracket assembly for receiving an external electrical device, comprising:

a dielectric frame having a substantially U-shaped structure including a bottom and two side walls extending upright from two sides of the bottom, a first gate formed in a front surface of the dielectric frame for entrance of the external electrical device; and a metal shielding comprising an upper plate and a parallel lower plate with a second gate bridging therebetween;

the second gate being registered with and abutting against the first gate of the dielectric frame; wherein the metal shielding includes a spring arm (33) consistently engaging a pivotal metal door (2), which is mounted on the first gate, for recovering the metal door back to an original position after the external electrical device is withdrawal from the frame.

8. The assembly as claimed in claim 7, further including another frame with another shielding thereon together below said frame, and secured thereto by said clip.

\* \* \* \* \*